United States Patent
Stephens et al.

(10) Patent No.: US 7,839,836 B2
(45) Date of Patent: Nov. 23, 2010

(54) ARRANGING SDMA POLL GROUPS BY RESPONSE LENGTH

(75) Inventors: Adrian P. Stephens, Cambridge (GB); Qinghua Li, Sunnyvale, CA (US); Xintian E. Lin, Palo Alto, CA (US); Minnie Ho, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1419 days.

(21) Appl. No.: 10/759,472

(22) Filed: Jan. 15, 2004

(65) Prior Publication Data

US 2005/0157695 A1 Jul. 21, 2005

Related U.S. Application Data

(60) Provisional application No. 60/493,937, filed on Aug. 8, 2003.

(51) Int. Cl.
*H04B 7/00* (2006.01)
*H04H 20/71* (2008.01)
*H04J 3/16* (2006.01)
*H04W 4/00* (2009.01)

(52) U.S. Cl. ............ 370/346; 370/312; 370/330; 455/518

(58) Field of Classification Search ........ 370/346, 370/230, 329, 334, 255, 260, 312, 330; 455/435.1, 455/450, 458, 516, 518, 519, 41.1–41.3, 455/500, 507

See application file for complete search history.

(56) References Cited

U.S. PATENT DOCUMENTS

| | | | | |
|---|---|---|---|---|
| 4,742,512 A | * | 5/1988 | Akashi et al. ........ | 370/347 |
| 5,748,100 A | * | 5/1998 | Gutman et al. ........ | 340/7.22 |
| 6,122,483 A | * | 9/2000 | Lo et al. ........... | 455/12.1 |
| 6,721,302 B1 | * | 4/2004 | Alastalo ............ | 370/346 |
| 6,807,159 B1 | | 10/2004 | Shorey et al. | |
| 6,967,937 B1 | * | 11/2005 | Gormley ............ | 370/330 |
| 7,206,293 B2 | * | 4/2007 | Kasapi et al. ........ | 370/312 |
| 7,352,718 B1 | * | 4/2008 | Perahia et al. ....... | 370/329 |

(Continued)

FOREIGN PATENT DOCUMENTS

EP 1263168 A2 12/2002

(Continued)

OTHER PUBLICATIONS

Movahhedina N. et al—Non-Uniform polling and reservation alternatives for bandwidth management un broadband wireless networks—Communications: the key to global prosperity. Blobecom 1996. London, Nov. 18-22, 1996, Global Telecommunications Conference (GLOBECOM), New York, IEEE, US vol. vol. 3, pp. 2068-2072.

(Continued)

*Primary Examiner*—George Eng
*Assistant Examiner*—Nam Huynh
(74) *Attorney, Agent, or Firm*—John F. Travis (57) ABSTRACT

A base station may organize poll groups into groups having similar predicted durations of subsequent responses. In one embodiment predicted durations may be provided by the devices that are to be polled. In another embodiment the predicted durations may be based on past responses from the devices that are to be polled.

10 Claims, 7 Drawing Sheets

U.S. PATENT DOCUMENTS

| | | | |
|---|---|---|---|
| 2003/0129985 A1* | 7/2003 | Naden et al. | 455/447 |
| 2004/0092288 A1* | 5/2004 | Moon et al. | 455/560 |
| 2004/0131039 A1* | 7/2004 | Benveniste | 370/346 |
| 2004/0131075 A1* | 7/2004 | Sinnarajah et al. | 370/431 |
| 2004/0209593 A1* | 10/2004 | Alberth et al. | 455/403 |
| 2005/0122999 A1* | 6/2005 | Scherzer et al. | 370/480 |

FOREIGN PATENT DOCUMENTS

| | | |
|---|---|---|
| EP | 1315335 A1 | 5/2003 |
| EP | 1361770 A1 | 11/2003 |
| JP | 55-049057 A | 4/1980 |
| JP | 61-094431 A | 5/1986 |
| JP | 10-013914 A | 1/1998 |
| JP | 2002-185475 A | 6/2002 |
| WO | 02/28119 A2 | 4/2002 |
| WO | WO 02/41647 A2 | 5/2002 |
| WO | WO 02/052885 A2 | 7/2002 |
| WO | 2005/015846 A2 | 2/2005 |

OTHER PUBLICATIONS

Hiertz G R et al—A decentralized reservation scheme for IEEE 802.11 ad hoc networks.—Personal, Indoor and Mobile Radio Communications, 2003. PIMRC 2003. 14th IEEE Proceedings on Sep. 7-10, 2003 Piscataway, NJ, vol. 2, Sep. 7, 2003 pp. 2576-2580.

PCT Search Report dated Mar. 31, 2005.

International Preliminary Report on Patentability for PCT Application No. PCT/US2004/025701 mailed Feb. 23, 2006, 8 pages.

* cited by examiner

ARRANGING SDMA POLL GROUPS BY RESPONSE LENGTH

The present application claims priority based on U.S. Provisional Application No. 60/493,937, entitled "HIGH-THROUGHPUT WIRELESS LAN SYSTEM APPARATUS AND ASSOCIATED METHODS" filed Aug. 8, 2003.

BACKGROUND

To address the problem of ever-increasing bandwidth requirements that are placed on wireless data communications systems, various techniques are being developed to allow multiple devices to communicate with a single base station by sharing a single channel. In one such technique, a base station may transmit or receive separate signals to or from multiple mobile devices at the same time on the same frequency, provided the mobile devices are located in sufficiently different directions from the base station. For transmission from the base station, different signals may be simultaneously transmitted from each of separate spaced-apart antennas so that the combined transmissions are directional, i.e., the signal intended for each mobile device may be relatively strong in the direction of that mobile device and relatively weak in other directions. In a similar manner, the base station may receive the combined signals from multiple independent mobile devices at the same time on the same frequency through each of separate spaced-apart antennas, and separate the combined received signals from the multiple antennas into the separate signals from each mobile device through appropriate signal processing so that the reception is directional.

Under currently developing specifications, such as IEEE 802.11 (IEEE is the acronym for the Institute of Electrical and Electronic Engineers, 3 Park Avenue, 17th floor, New York, N.Y.), each mobile device may transmit a data block of variable length, and then wait for a predetermined timeout period after the data block for an acknowledgment from the base station to signify that the base station received the data block. If the base station transmits and receives on the same frequency, that fact may preclude the base station from transmitting and receiving at the same time, so that the base station waits until all incoming data blocks are complete before sending out any acknowledgments. However, since the data blocks are of variable length, a mobile device sending a short data block may experience an acknowledgment timeout while the base station is still receiving a long data block from another mobile device. The resulting unnecessary retransmission of the short data block may cause inefficiencies in the overall data communications, and under some circumstances may even result in a service interruption.

BRIEF DESCRIPTION OF THE DRAWINGS

The invention may be understood by referring to the following description and accompanying drawings that are used to illustrate embodiments of the invention. In the drawings.

DETAILED DESCRIPTION OF THE INVENTION

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

In keeping with common industry terminology, the terms "base station", "access point", and "AP" may be used interchangeably herein to describe an electronic device that may communicate wirelessly and substantially simultaneously with multiple other electronic devices, while the terms "mobile device" and "STA" may be used interchangeably to describe any of those multiple other electronic devices, which may have the capability to be moved and still communicate, though movement is not a requirement. However, the scope of the invention is not limited to devices that are labeled with those terms. Similarly, the terms "spatial division multiple access" and SDMA may be used interchangeably. As used herein, these terms are intended to encompass any communication technique in which different signals may be transmitted by different antennas substantially simultaneously from the same device such that the combined transmitted signals result in different signals intended for different devices being transmitted substantially in different directions on the same frequency, and/or techniques in which different signals may be received substantially simultaneously through multiple antennas on the same frequency from different devices in different directions and the different signals may be separated from each other through suitable processing. The term "same frequency", as used herein, may include slight variations in the exact frequency due to such things as bandwidth tolerance, Doppler shift adaptations, parameter drift, etc. Two or more transmissions to different devices are considered substantially simultaneous if at least a portion of each transmission to the different devices occurs at the same time, but does not imply that the different transmissions must start and/or end at the same time, although they may. Similarly, two or more receptions from different devices are considered substantially simultaneous if at least a portion of each reception from the different devices occurs at the same time, but does not imply that the different transmissions must start and/or end at the same time, although they may. Variations of the words represented by the term SDMA may sometimes be used by others, such as but not limited to substituting "space" for "spatial", or "diversity" for "division". The scope of various embodiments of the invention is intended to encompass such differences in nomenclature.

Some embodiments of the invention may arrange poll groups so that the mobile devices in a particular poll group have transmissions of similar duration and the transmissions therefore end within a defined time range of each other, thereby reducing the likelihood of a mobile device experiencing an acknowledgment timeout. In a particular embodiment each mobile device may transmit an indication of the predicted duration of its subsequent transmission, so that a base station may arrange the mobile devices into poll groups of similar transmission length before polling for those subsequent transmissions. In another particular embodiment the base station may use the length of a previous transmission as a predictor of the duration of a subsequent transmission from the same mobile device.

Figure 1:
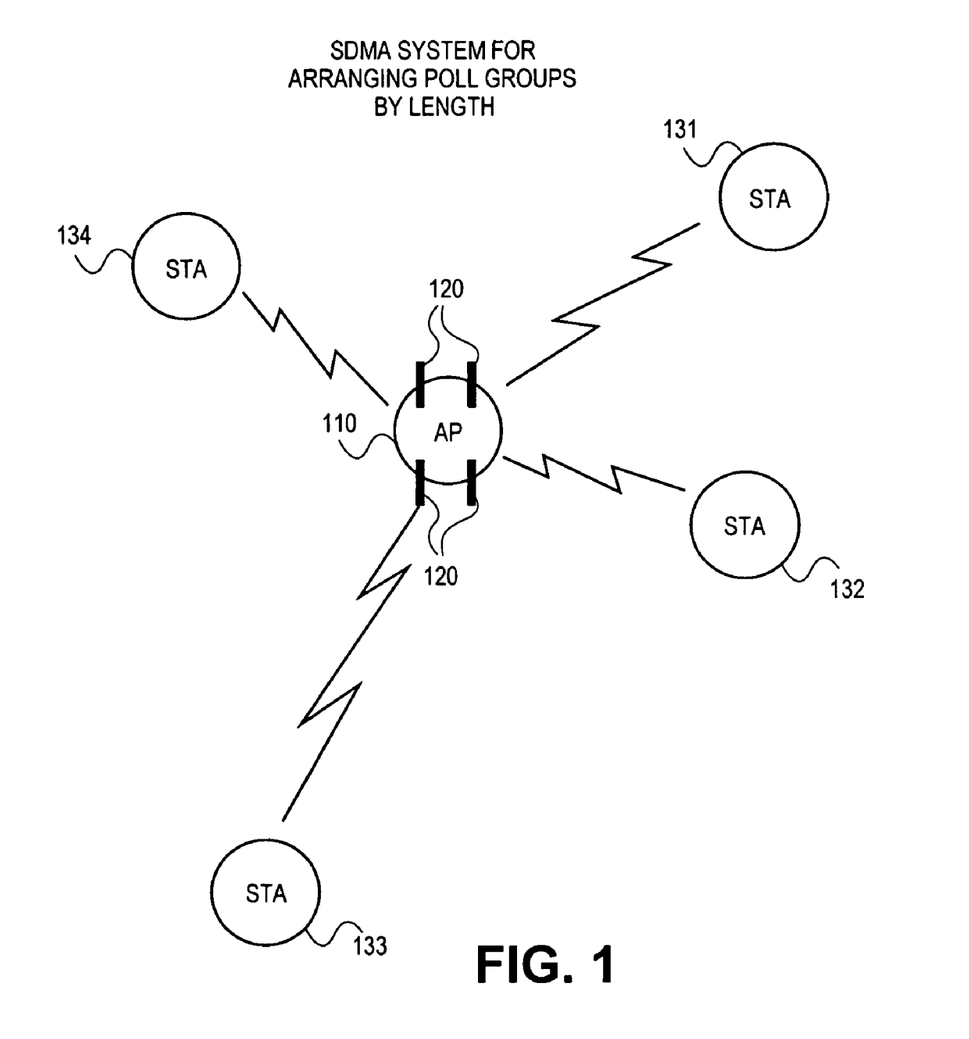
FIG. 1 shows a diagram of a communications network, according to an embodiment of the invention.

FIG. 1 shows a diagram of a communications network, according to an embodiment of the invention. The illustrated embodiment of an SDMA-based network shows an AP 110 that may communicate with multiple STAs 131-134 located in different directions from the AP. Although AP 110 is shown with four antennas 120 to communicate with up to four STAs at a time, other embodiments may have other arrangements. In some embodiments the STAs may be in fixed locations, but in other embodiments at least some of the STAs may move during and/or between communications sequences. In some embodiments the AP 110 may be in a fixed location, but in other embodiments the AP 110 may be mobile. The communications between the base station and the mobile devices may follow the techniques described herein.

Figure 2A:
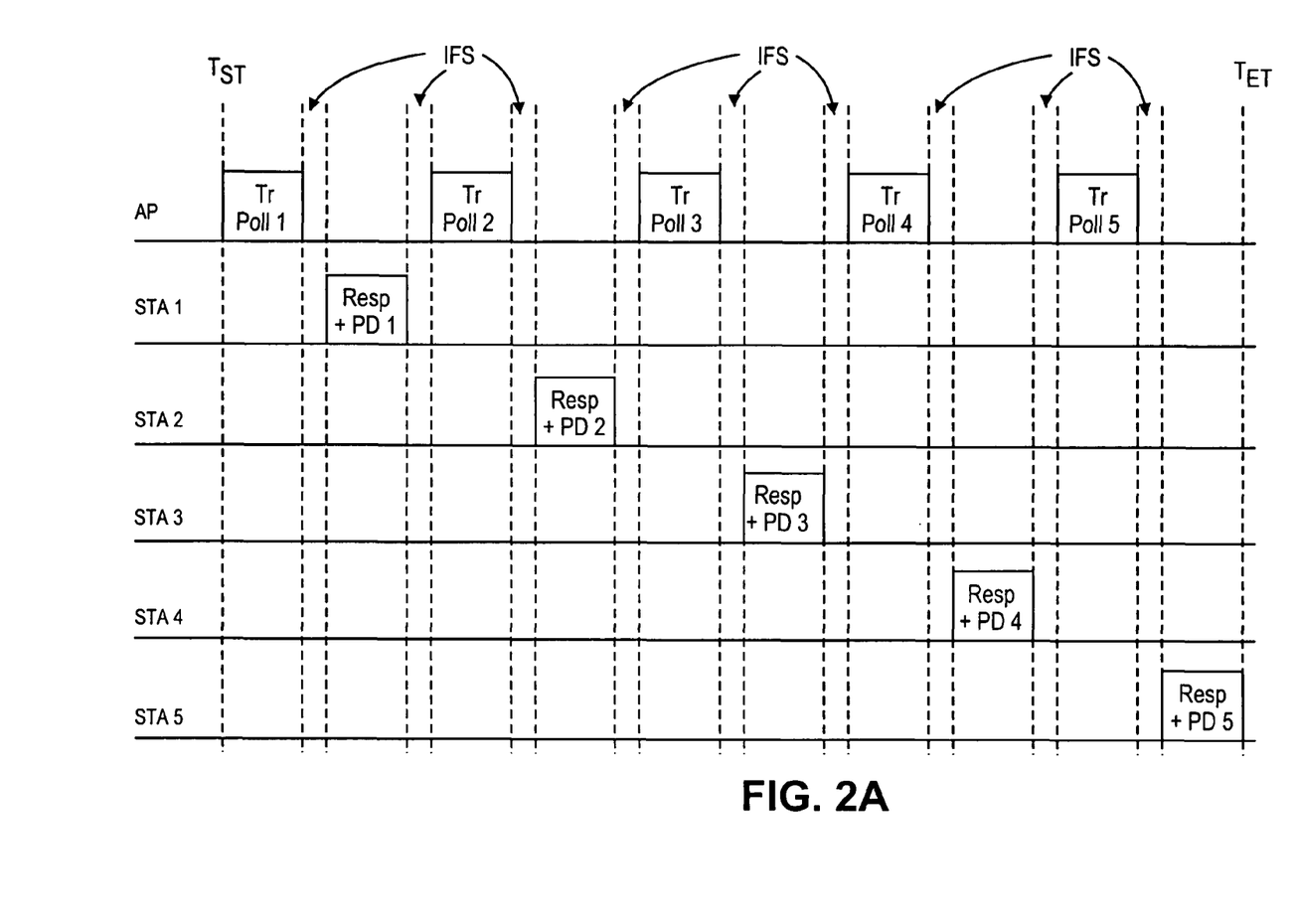
FIGS. 2A and 2B show timing diagrams of communications sequences involving a base station and multiple mobile devices, according to an embodiment of the invention.

FIG. 2A shows a training phase, extending from a training start time $T_{ST}$ until a training end time $T_{ET}$, during which several mobile devices (STAs) are each sent a training poll (Tr Poll) from a base station (AP) and respond by sending back to the AP a training response (Resp) and a predicted duration (PD) of a subsequent transmission to the AP. As an example, the illustrated embodiment shows 5 STAs in this particular training phase, but the scope of the invention is not limited to this quantity. For each illustrated STA x, the training poll to that STA is indicated as Tr Poll x, while the predicted length from that STA is indicated as PD x. Each transmission and reception are shown separated in time by an interframe space (IFS), although the invention is not limited in this regard. Interframe spaces may allow a period of 'idle time' in the communications sequence, which may be used for things such as, but not limited to: 1) timing differences due to tolerances in the clocks used in the different devices, 2) time for processing that may need to take place before the next transmission or reception, 3) time to switch a transceiver from transmit mode to receive mode, or from receive mode to transmit mode, 4) etc. Interframe spaces may be of uniform duration, or may have different durations depending on their placement in the communications sequence. In the illustrated embodiment a single STA responds to a single poll before the next STA is polled and responds, but various embodiments of the invention may use other techniques. In some embodiments each poll may be transmitted omnidirectionally, so that all STAs within range may receive a training poll, but only the one that is addressed may respond to it. However, various embodiments of the invention are not limited in this regard.

Each training response may be a transmission with a content known to the AP so that the AP may determine SDMA parameters needed for subsequent communications with the particular STA. The AP may process the received training response to derive those parameters and then use the parameters to enable directional communications with that particular STA in subsequent communications sequences, using currently known or yet to be developed techniques.

The PD may be the predicted duration of the next transmission that will be sent by the STA to the AP. In some operations, the next transmission may already be queued up within the STA so that the duration is known. In other operations the duration may have to be estimated using various criteria. Unless otherwise stated, the term 'predicted duration' is used herein to encompass both known and estimated durations. In some embodiments the transmission from the STA may contain multiple independently verifiable blocks, and the predicted duration may be in a different block than the training response, but the invention is not limited in this regard.

While in some embodiments the predicted duration may be expressed directly as a duration of time, other embodiments may express the predicted duration in other ways (e.g., a quantity of data, an indirect indicator that can be converted to time, etc.). In some embodiments the units of the expressed predicted duration may already be known by the AP, but other embodiments may use other techniques (e.g., the STA may specify the units along with the predicted duration expressed in those units). The predicted durations may have any feasible degree of precision (e.g., microseconds, bytes, pre-defined block lengths, etc.), and the degree of precision may be previously determined or specified along with the predicted duration.

Figure 2B:
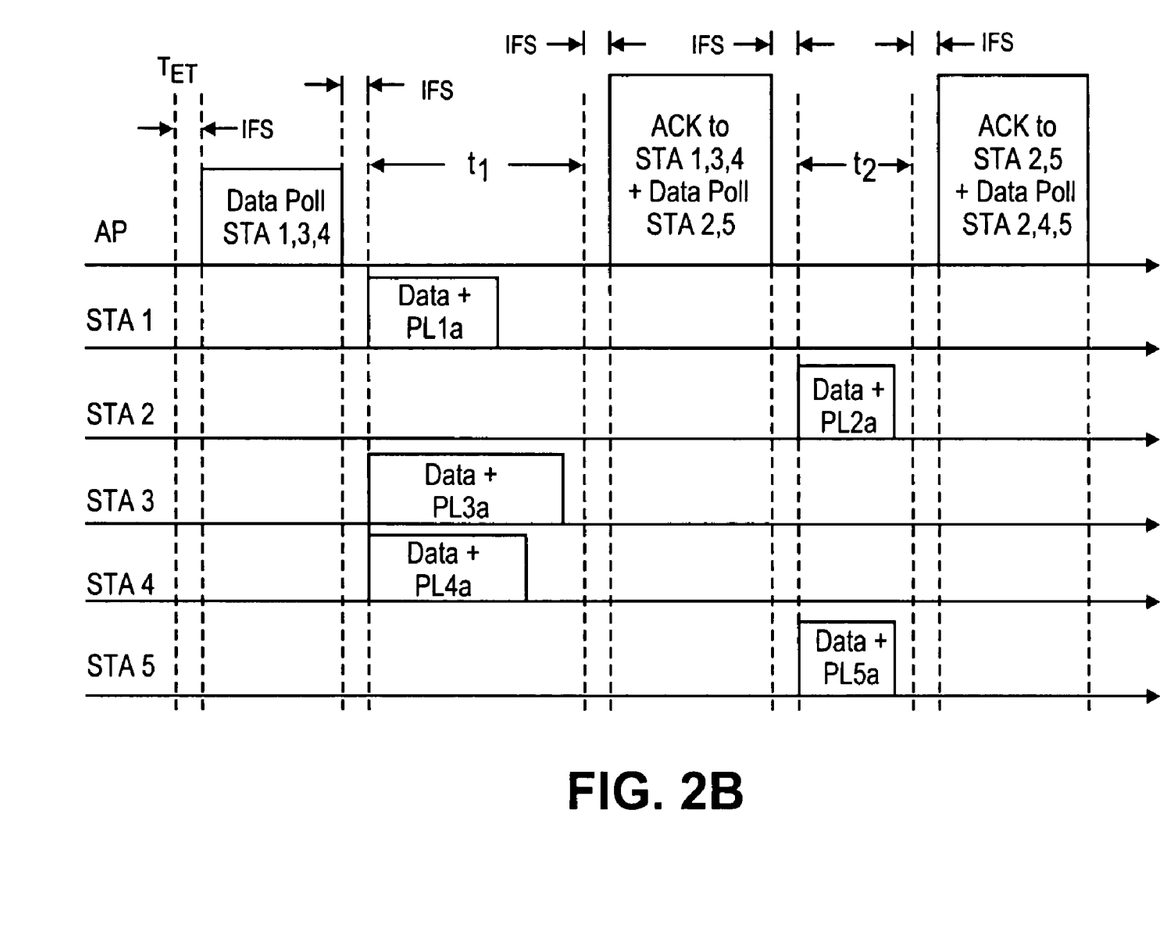

The training phase may be followed, either immediately or at a later time, by a data phase. FIG. 2B shows a data phase, according to an embodiment of the invention. As a result of information gained by processing the training responses, the AP may have determined the parameters necessary to permit multi-directional transmissions and receptions by the AP. Using those parameters, the AP may then directionally transmit different data blocks to different ones of the STAs substantially simultaneously, and receive different data blocks from different ones of the STAs substantially simultaneously. In the specific operation shown in FIGS. 2A and 2B, the training phase is followed by a data phase involving the same STAs that were in the training phase, but other operations may have other communications between the training phase and the related data phase, and/or may initiate a data phase involving a different group of STAs than those in the immediately preceding training phase (e.g., the AP may already have the relevant parameters for some STAs from one or more earlier training phases).

As a result of learning the predicted durations of the subsequent data responses from the various STAs, the AP may create poll groups in which all the STAs in a group have similar predicted durations for their data responses. How closely the data response durations in a particular poll group must match may depend on various factors (e.g., the acknowledgment timeout periods for the STAs in a group, etc.). In the illustrated example of FIG. 2B, STAs 1, 3, and 4 have been determined to have similar predicted data response durations and have been placed into a first poll group, while STAs 2 and 5 have been determined to have similar predicted data response durations and have been placed into a second poll group.

In the illustrated example, the first poll group consisting of STAs 1, 3 and 4 may be polled. In some embodiments the polls may be transmitted directionally and substantially simultaneously using SDMA techniques, but other embodiments may use other techniques (e.g., an omnidirectional multicast may be used). The polled STAs may respond during data response time period $t_1$. Time period $t_1$ may be adjusted based on the longest of the transmissions from STA 1, 3 and 4, although various embodiments of the invention are not limited in this respect. In one embodiment the time period may be predetermined by the AP (and specified in the poll) based on the predicted durations of the relevant responses, while in another embodiment the time period may last as long as one of the polled devices is still responding. Interframe spaces are shown both before and after data polls and data response periods, and may serve the same purposes as previously described, although the scope of the invention is not limited in this respect.

In some embodiments, the responding STAs may also include a predicted duration of their next transmission, which may be different than the duration of the current transmission. These are indicated as PL1a, PL3a and PL4a for STAs 1, 3 and 4, respectively. If no predicted duration is included with a data transmission, the AP may assume the most recent predicted duration for a particular STA is still correct.

After the conclusion of the responses from STAs 1, 3 and 4 during time period $t_1$, the AP may transmit acknowledgments to STAs 1, 3, and 4, signifying that the responses were received correctly. Because the responses from STAs 1, 3 and 4 ended within an acceptable time of the end of $t_1$, any acknowledgment timeout periods that were begun by STAs 1, 3 and 4 should not expire before the acknowledgments are received from the AP. Also within the period between $t_1$ and $t_2$, the AP may poll the second poll group consisting of STAs 2 and 5. Similar to the description for the first poll group, STAs 2 and 5 may respond during time period $t_2$. As before, each response may include a predicted duration of the subsequent data transmission in addition to the data in the current transmission.

After the conclusion of response time period $t_2$, the AP may acknowledge the responses from STA 2 and 5, and may also poll another poll group. This may be the first poll group, consisting of STAs 1, 3, and 4. However, the AP may rearrange poll groups before transmitting the next set of data polls. In the example shown the AP has dynamically rearranged poll groups based on the most recent predicted data response durations received from STAs 1, 2, 3, 4 and 5. In the new grouping, STAs 2, 4 and 5 are determined to be close enough in predicted response duration to be placed in a poll group. STAs 1 and 3 might be placed into a common poll group, or might be placed in separate poll groups (not shown). In some embodiments a poll group may consist of as few as one STA.

In addition to the factors previously discussed, poll groups may be determined by other factors. For example, if one or more of the expected responses was not received, or was received with unrecoverable errors, the AP may not send an ACK to the corresponding STA, and that STA may try to retransmit later when it is polled again. The poll group into which it falls may be based on the previous predicted duration for that response. In another example, movement of the STAs may bring two STAs into the same directional space from the AP so that they cannot be effectively communicated with in the same poll group using SDMA techniques, even though they have similar predicted response durations.

Figure 3:
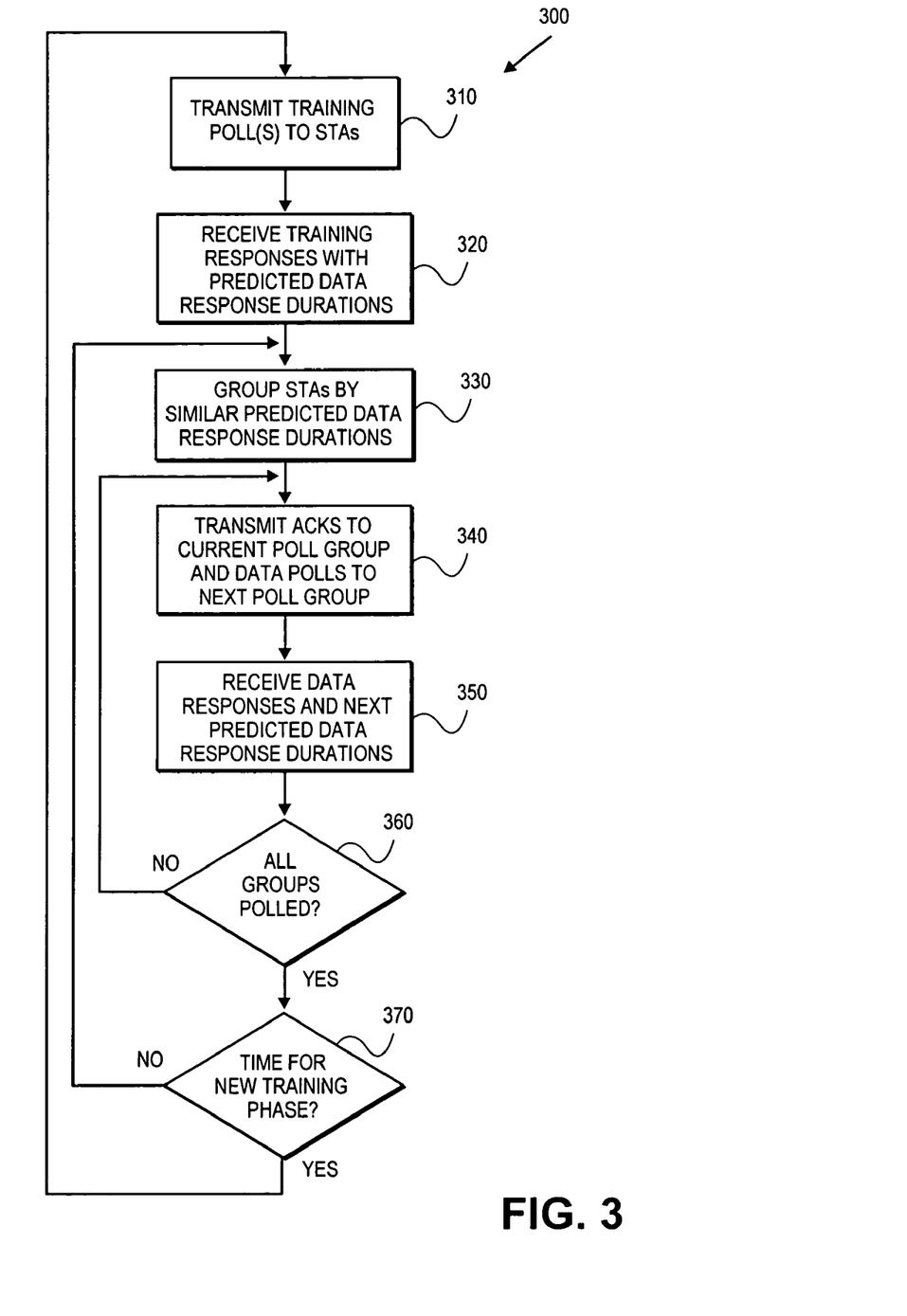
FIG. 3 shows a flow chart of a method of communications, according to an embodiment of the invention.

FIG. 3 shows a flow chart of a method of operation which may be performed by a base station, according to an embodiment of the invention. In flow chart 300, at 310 training polls may be transmitted to multiple STAs, using any feasible technique. The training responses from the multiple polled STAs may be received at 320, as well as the predicted durations of subsequent data transmissions from the STAs. After the training phase of 310 and 320, the identities of the various STAs may be ordered into groups at 330, with the STAs in each group having predicted data response durations that are within a predefined range of each other.

Block 340 may be the entry point for a sequence of operations that may poll multiple poll groups and receive data responses in return. If this is the first data poll after a training phase for the STAs in this poll group, the base station may transmit data polls to the initial poll group of STAs at 340, and at 350 receive data responses from the polled STAs, as well as predicted data response durations from the polled STAs that predict the duration of the next data transmission from each responding STA. At 360 control returns to 340 to poll the next poll group. After the initial poll group, at 340 acknowledgments may be transmitted to the responding STAs from the previous poll group and data polls may be transmitted to the current poll group, while at 350 the data responses and predicted durations from the current poll group may be received. Any given poll group may include at least one STA that is being polled for the first time since its most recent training phase, as well as at least one STA that has already transmitted at least one data response since its last training phase. In such cases, the AP at 340 may transmit ACKs to some of the STAs in the poll group but not to others.

After all poll groups have been handled in this manner, as determined at 360, a decision may be made at 370 if it is time for a new training phase. In some embodiments, a new training phase may be repeated at regular intervals, which may be based things such as, but not limited to, a worst-case estimate of how rapidly the STAs are expected to move into a different spatial direction from the AP, thereby requiring a calculation of new SDMA parameters. In other embodiments, the need for a new training phase may be based on other things (e.g., worsening signal quality, bandwidth limitations of the AP, etc.). If a new training phase is needed, control may return to 310 to repeat the previously described process. If a new training phase is not needed, control may return to 330, where the STAs may be regrouped as needed based on the most recent predictions for data response durations and/or other considerations, and the loop at 340, 350 and 360 may then be repeated.

Although the embodiment of FIG. 3 shows a decision for a new training phase being made only after all poll groups have been polled, other embodiments may use other techniques (e.g., a new training phase may be started after any poll/response sequence). A given training phase may include all, or only a subset of, the STAs currently included in the various poll groups, and/or may include new STAs that are not in any of the current poll groups.

Figure 4:
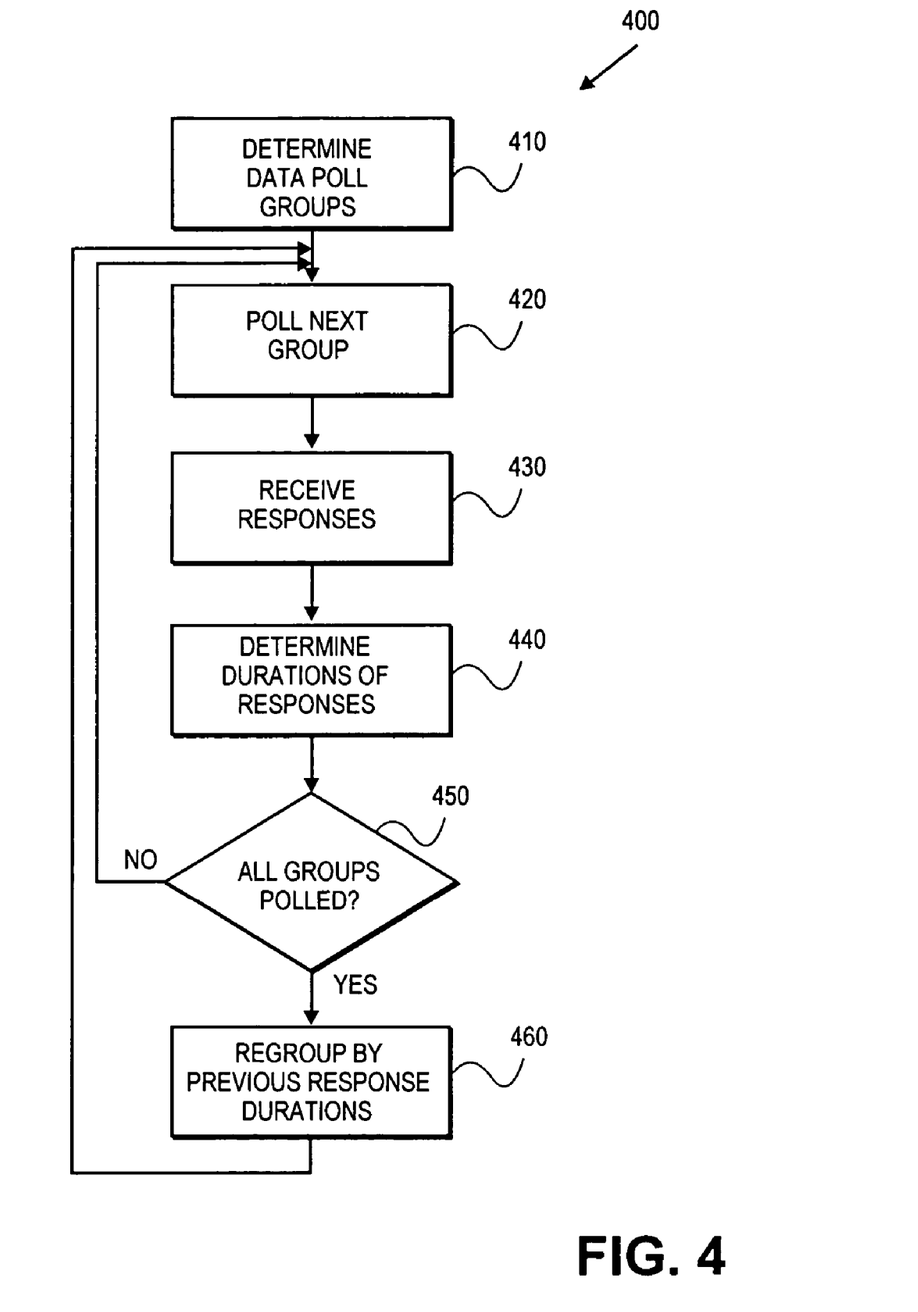
FIG. 4 shows a flow chart of another method of communications, according to an embodiment of the invention.

FIG. 4 shows a flow chart of another embodiment in which predicted durations are determined by the AP from the duration of past transmissions rather than from predicted durations supplied by the STAs. The timing diagram of FIG. 2B may be used again for reference, although the specifics of FIG. 2B should not be read as limitations on the scope of the operations of FIG. 4. In flow chart 400, at 410 the initial poll groupings may be determined in any feasible manner. At 420, the STAs in a particular poll group may be polled together based on this grouping (STAs 1, 3, 4 in the example of FIG. 2B). After the responses from the STAs in this poll group are received at 430, the predicted duration of the next response from each STA may be determined at 440 based on the actual duration of the received responses from that STA. In some embodiments, the duration of the last-received response from a STA is determined to be the predicted duration of the next response from that STA. In other embodiments, other techniques may be used (e.g., an average of the durations of the last several responses may be used, statistics may be kept of the durations of different types of responses and the type of the next response may determine which statistic will be used, etc.). After all poll groups have been polled and have responded, as determined at 450, the relevant STAs may be regrouped based on the most recent predicted response durations for the STAs, and the polling may resume at 420. As previously described, factors other than predicted duration may also be used to determine poll groups. Also as previously described, a new training phase may be performed at any time for any feasible reason.

Figure 5:
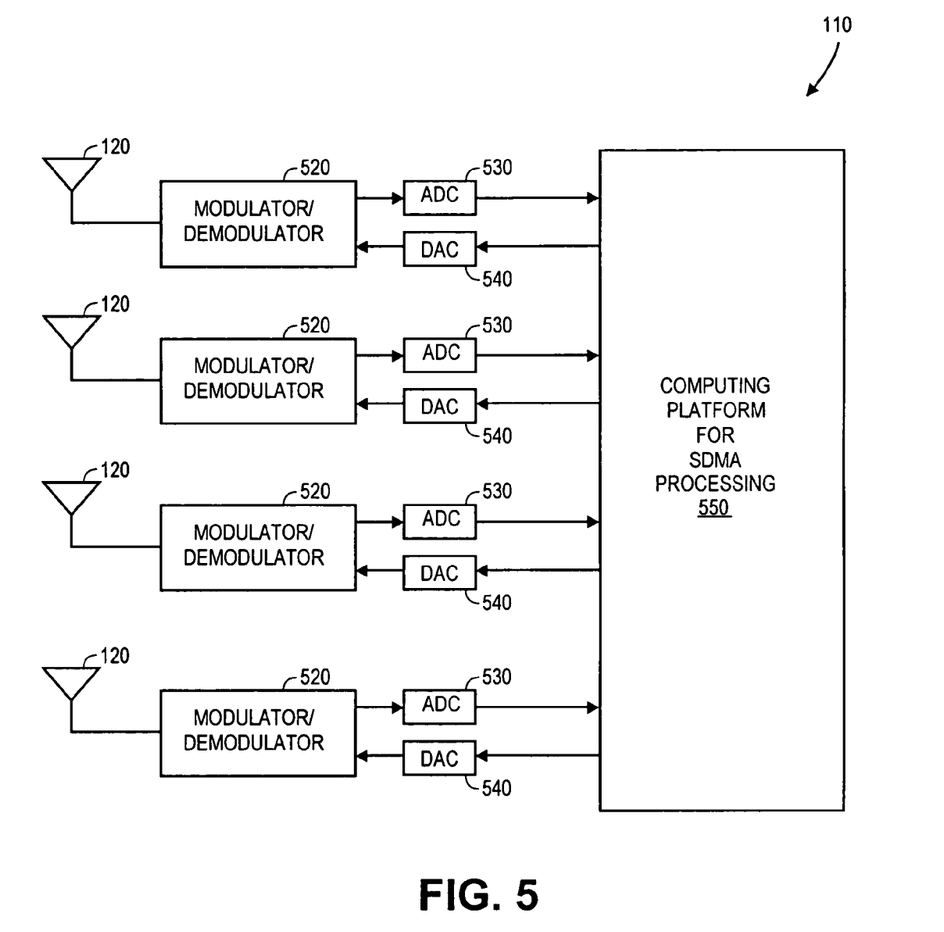
FIG. 5 shows a block diagram of a base station, according to an embodiment of the invention.

FIG. 5 shows a block diagram of a base station, according to an embodiment of the invention. Computing platform 550 may include one or more processors, and at least one of the one or more processors may be a digital signal processor (DSP). In the illustrated embodiment, AP 110 has four antennas 120, but other embodiments may have two, three, or more than four antennas. For each antenna, AP 110 may have a modulator/demodulator 520, an analog-to-digital converter (ADC) 530, and a digital-to-analog converter (DAC) 540. The combination of demodulator-ADC may convert received radio frequency signals from the antenna into digital signals suitable for processing by the computing platform 550. Similarly, the combination of DAC-modulator may convert digital signals from the computing platform 550 into radio frequency signals suitable for transmission through an antenna. Other components not shown may be included in the illustrated blocks as needed, such as but not limited to amplifiers, filters, oscillators, the use of multiple components where only one is shown, etc.

Figure 6:
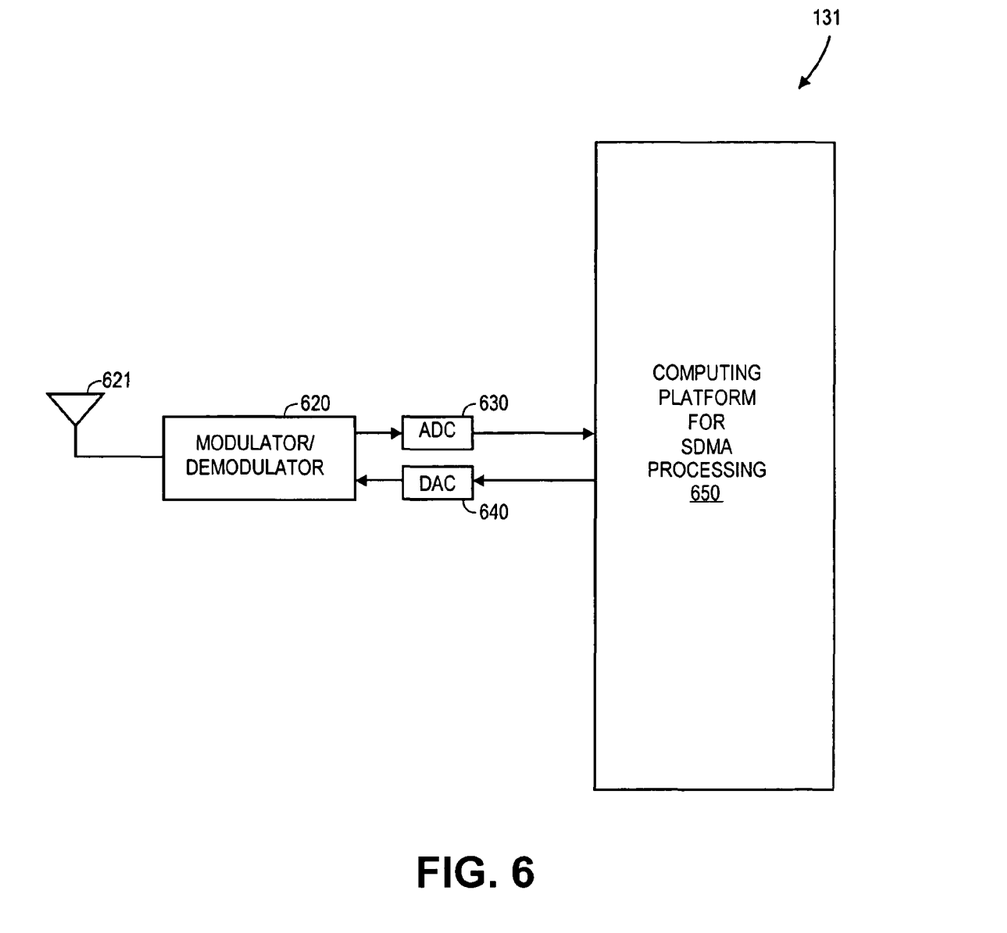
FIG. 6 shows a block diagram of a mobile device, according to an embodiment of the invention.

FIG. 6 shows a block diagram of a mobile device, according to an embodiment of the invention. The illustrated components of mobile device 131 may include a computing platform 650, antenna 621, modulator/demodulator 620, ADC 630, and DAC 640 that may be functionally similar to those similarly-named components of FIG. 5, but the device of FIG. 6 is shown with a single antenna/modulator/demodulator/ADC/DAC combination, and the computing platform 650 may perform the operations previously described for a mobile device rather than a base station, although various embodiments of the invention are not limited in these respects.

The foregoing description is intended to be illustrative and not limiting. Variations may occur to those of skill in the art. Those variations are intended to be included in the various embodiments of the invention, which are limited only by the spirit and scope of the appended claims.

Some embodiments of the invention may be implemented as a machine-readable medium that provides instructions, which when executed by a processing platform, cause said processing platform to perform the operations described herein.

What is claimed is:

1. An apparatus, comprising
a first electronic device adapted to:
   receive a data transmission from each of multiple second electronic devices, each of the data transmissions including a predicted duration of a subsequent transmission from the respective second electronic device;
   organize at least some of multiple second electronic devices into a group having similar predicted durations for the subsequent data transmissions; and
   transmit polls substantially simultaneously to the second electronic devices within the group.

2. The apparatus of claim 1, wherein the first electronic device is further adapted to receive the data transmissions from the second electronic devices within the group substantially simultaneously.

3. The apparatus of claim 1, wherein the first electronic device is further adapted to transmit acknowledgements to the wireless devices within the group substantially simultaneously.

4. The apparatus of claim 1, wherein the first electronic device is further adapted to transmit polls to other second electronic devices within another group substantially simultaneously.

5. The apparatus of claim 1, wherein the apparatus comprises:
   a computing platform; and
   at least four antennas coupled to the computing platform.

6. The apparatus of claim 5, wherein the apparatus further comprises at least four modulator/demodulators coupled between the computing platform and the at least four antennas.

7. A method, comprising:
   receiving indicators from multiple electronic devices indicating predicted durations of subsequent transmissions from the electronic devices;
   organizing, subsequent to said receiving, the multiple electronic devices into a first group having the indicators for the predicted durations of the subsequent transmissions within a particular range of a first value and into a second group having the indicators for the predicted durations of the subsequent transmissions within a particular range of a second value;
   transmitting data polls to the electronic devices in the first group substantially simultaneously; and
   transmitting data polls to the electronic devices in the second group substantially simultaneously, subsequent to said transmitting to the electronic devices in the first group.

8. The method of claim 7, further comprising determining the indicators for the predicted durations based on durations of previously received transmissions from the electronic devices, prior to said organizing.

9. A machine-readable medium that provides instructions, which when executed by a processing platform, cause said processing platform to perform operations comprising:

receiving indicators for predicted durations of subsequent transmissions from multiple electronic devices;

organizing the multiple electronic devices into a first group having the indicators for the predicted durations of the subsequent transmissions within a particular range of a first value and into a second group having the indicators for the predicted durations of the subsequent transmissions within a particular range of a second value;

transmitting data polls to the electronic devices in the first group substantially simultaneously; and     transmitting data polls to the electronic devices in the second group substantially simultaneously, subsequent to said transmitting to the electronic devices in the first group.

10. The medium of claim 9, wherein the operations further comprise determining the indicators for the predicted durations based on durations of previously received transmissions from the electronic devices, prior to said organizing.

* * * * *